(12) United States Patent
Kwak et al.

(10) Patent No.: US 8,498,743 B2
(45) Date of Patent: Jul. 30, 2013

(54) ROBOT AND METHOD OF CONTROLLING BALANCE THEREOF

(75) Inventors: Ho Seong Kwak, Seoul (KR); Kyung Shik Roh, Seongnam-si (KR); Woong Kwon, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 706 days.

(21) Appl. No.: 12/588,847

(22) Filed: Oct. 29, 2009

(65) Prior Publication Data

US 2010/0161116 A1    Jun. 24, 2010

(30) Foreign Application Priority Data

Dec. 22, 2008 (KR) .......................... 10-2008-131032

(51) Int. Cl.
*G06F 19/00* (2006.01)
(52) U.S. Cl.
USPC ........... 700/245; 700/247; 700/249; 700/250; 700/253; 700/254; 700/261; 700/262; 318/568.11; 318/568.12; 318/568.16; 318/568.17; 318/568.19
(58) Field of Classification Search
USPC ................. 700/245, 247, 249, 250, 253, 254, 700/261, 262; 318/568.11, 568.12, 568.16, 318/568.17, 568.19, 568.2
See application file for complete search history.

(56) References Cited

U.S. PATENT DOCUMENTS

| | | | | |
|---|---|---|---|---|
| 4,834,200 A | * | 5/1989 | Kajita | 180/8.1 |
| 5,337,235 A | * | 8/1994 | Takahashi et al. | 701/23 |
| 5,594,644 A | * | 1/1997 | Hasegawa et al. | 701/23 |
| 5,758,298 A | * | 5/1998 | Guldner | 701/23 |
| 6,243,623 B1 | * | 6/2001 | Takenaka et al. | 700/245 |
| 7,949,428 B2 | * | 5/2011 | Endo et al. | 700/245 |
| 8,024,070 B2 | * | 9/2011 | Sano et al. | 700/254 |
| 2004/0148268 A1 | * | 7/2004 | Reil | 706/904 |
| 2005/0075755 A1 | * | 4/2005 | Takenaka et al. | 700/245 |
| 2005/0113973 A1 | * | 5/2005 | Endo et al. | 700/245 |
| 2005/0217406 A1 | * | 10/2005 | Jiang | 74/490.01 |
| 2007/0016329 A1 | * | 1/2007 | Herr et al. | 700/250 |
| 2007/0145930 A1 | * | 6/2007 | Zaier | 318/568.12 |
| 2007/0220637 A1 | * | 9/2007 | Endo et al. | 901/2 |
| 2007/0260355 A1 | * | 11/2007 | Morimoto et al. | 700/245 |
| 2008/0185985 A1 | * | 8/2008 | Miyazaki | 318/568.12 |

(Continued)

OTHER PUBLICATIONS

Laszlo, Joseph, Controlling Bipedal Locomotion for Computer Animation, 1996, Master of Applied Sciebce, University of Toronto, pp. 1-124.*

(Continued)

*Primary Examiner* — Ronnie Mancho
*Assistant Examiner* — Jamie Figueroa
(74) *Attorney, Agent, or Firm* — Staas & Halsey LLP

(57) ABSTRACT

A finite state machine (FSM)-based biped robot, to which a limit cycle is applied to balance the robot right and left on a two-dimensional space, and a method of controlling balance of the robot. In order to balance an FSM-based biped robot right and left on a two-dimensional space, control angles to balance the robot according to states of the FSM-based biped robot are set. The range of the control angles is restricted to reduce the maximum right and left moving distance of the biped robot and thus to reduce the maximum right and left moving velocity of the biped robot, thereby reducing the sum total of the moments of the biped robot and thus allowing the ankles of the biped robot to balance the biped robot to be controlled, and causing the soles of the feet of the biped robot to parallel contact the ground.

15 Claims, 9 Drawing Sheets

U.S. PATENT DOCUMENTS

| | | | | |
|---|---|---|---|---|
| 2008/0275831 | A1* | 11/2008 | Reil | 706/23 |
| 2009/0030344 | A1* | 1/2009 | Moser et al. | 600/587 |
| 2009/0055021 | A1* | 2/2009 | Sano et al. | 700/254 |
| 2010/0113980 | A1* | 5/2010 | Herr et al. | 600/587 |
| 2010/0114329 | A1* | 5/2010 | Casler et al. | 623/24 |
| 2010/0174385 | A1* | 7/2010 | Casler et al. | 623/50 |
| 2010/0179668 | A1* | 7/2010 | Herr et al. | 623/51 |

OTHER PUBLICATIONS

Laszlo et al., Limit Cycle Control and Its Application to the Animation of Balancing and Walking—1996, Proceeding SIGGRAPH '96—Proceedings of the 23rd annual conference on Computer graphics and interactive techniques, pp. 155-162.*

* cited by examiner

ROBOT AND METHOD OF CONTROLLING BALANCE THEREOF

CROSS-REFERENCE TO RELATED APPLICATIONS

This application claims the benefit of Korean Patent Application No. 2008-0131032, filed Dec. 22, 2008, in the Korean Intellectual Property Office, the disclosure of which is incorporated herein by reference.

BACKGROUND

1. Field

The present invention relates to a robot and a method of controlling balance thereof, and more particularly to a biped walking robot, which balances itself right and left on a two-dimensional space, and a method of controlling balance of the biped walking robot.

2. Description of the Related Art

In general, machines, which conduct motions similar to those of a human being using an electrical or magnetic action, refer to robots. Initial robots were industrial robots, such as manipulators or transfer robots, for work automation and unmanned operation in a production field, which perform dangerous work, simple repetitive work, or work requiring large force in place of a human being. Recently, biped walking robots, which have a joint system similar to that of a human being, live together with the human being in human working and living spaces, and walk with two feet, have been vigorously researched and developed.

Methods of controlling the walking of a biped robot include a position-based zero moment point (ZMP) control method, and a torque-based finite state machine (FSM) control method. The FSM control method means all methods, which use a torque control but do not use a ZMP control. In the FSM control method, finite states of the biped robot are defined in advance, and then the finite states of the biped robot are sequentially changed while walking, thus allowing the biped robot to properly walk.

The above FSM-based biped robot uses a limit cycle in order to balance itself on a two-dimensional space. The limit cycle means a trajectory movement, which forms a closed loop according to time on the two-dimensional space. In case that values of a function according to time form a random route in the closed loop as time infinitely goes by, the closed loop is referred to as the limit cycle (with reference to FIG. 1).

The limit cycle is divided into stable regions and unstable regions, and performs a nonlinear control. A region of the limit cycle, which is in a regular closed loop range, is referred to as a stable region, and a region of the limit cycle, which is not in the regular closed loop range but diverges radially or converges into one point, is referred to as an unstable region.

In order to allow the FSM-based biped robot to balance itself right and left on a two-dimensional space using the limit cycle, the maximum right and left moving distance of the robot should be reduced. However, the biped robot, which has a joint system similar to that of a human being, has an interval between two legs, i.e., a hip interval, due to actuators and several frames of hardware, and thus the radius of the limit cycle is increased according to this interval. When the radius of the limit cycle is increased, the right and left moving velocity of the robot is increased, and thus it is difficult to control ankles of the biped robot to balance the biped robot. Therefore, the feet of the biped robot (particularly, the soles of the feet) cannot parallel contact the ground, and thus the biped robot cannot achieve stable walking.

SUMMARY

Therefore, one aspect of the invention is to provide an FSM-based biped robot, which restricts the range of limit cycle control angles to balance the robot right and left on a two-dimensional space to reduce the maximum right and left moving distance of the biped robot, and a method of controlling balance of the robot.

In accordance with one aspect, the present invention provides a method of controlling balance of a robot including reducing a range of control angles to balance the robot; and controlling the control angles using a sinusoidal function to balance the robot within a limit cycle.

The robot may be a finite state machine (FSM)-based biped walking robot.

The control angles may be reduced in consideration of the center of gravity of the robot moving according to states of the FSM.

The states of the FSM may include a double support (DS) state, in which the robot is supported with both its feet, a single support right (SS(R)) state, in which the robot is supported with its right foot, and a single support left (SS(L)) state, in which the robot is supported with its left foot.

The reduction of the range of the control angles may be achieved by reducing an interval between both feet on the ground by drawing both legs inward in the DS state.

The reduction of the range of the control angles may be achieved by reducing the maximum right and left moving distance of the robot.

The range of the control angels may be designated using ZMP data based on inertia and acceleration of the robot such that the radius of the limit cycle is reduced.

The control angles may arise from the contact point of the robot with the ground, and control ankles of the robot.

The control angles may be set to angles between a vector being perpendicular to the ground and a vector coming up to the center of gravity of the robot.

The control of the control angles using the sinusoidal function may be achieved such that the limit cycle forms a stable closed loop according to the states of the FSM.

The control of the control angles using the sinusoidal function may be achieved such that relations of the control angles and control angular velocities, which are differential components of the control angles, form the limit cycle in the stable closed loop on a two-dimensional space.

The control angle and the control angular velocity in the DS state may be maximum.

The control angle and the control angular velocity in the SS(R) or SS(L) state may be minimum.

In accordance with another aspect, the present invention provides a robot including ankles; a set unit to set control angles of the ankles; and a control unit to reduce a range of the set control angles and control the control angles using a sinusoidal function to control the angles of the ankles within a limit cycle.

The set unit may set the control angles corresponding to states of the FSM to balance the robot.

The control unit may control the control angles using the sinusoidal function such that the limit cycle forms a stable closed loop according to the states of the FSM.

The robot may further include F/T sensors to measure ZMP data based on inertia and acceleration of the robot, and the control unit may reduce the range of the control angles set according to the states of the FSM using the ZMP data.

The control unit may reduce the range of the control angles by reducing an interval between both feet on the ground by drawing both legs inward in the DS state.

The control unit may reduce the range of the control angles by reducing the maximum right and left moving distance of the robot.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION OF EMBODIMENTS

Figure 1:
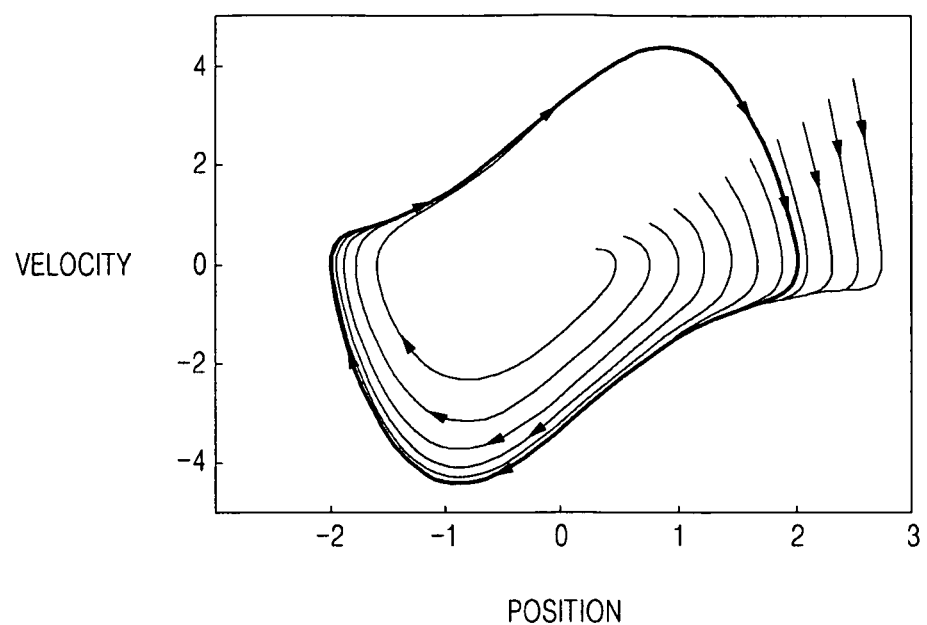
FIG. 1 is a view illustrating the concept of a limit cycle applied to the present invention.

Reference will now be made in detail to the embodiment of the present invention, an example of which is illustrated in the accompanying drawings, wherein like reference numerals refer to like elements throughout. The embodiment is described below to explain the present invention by referring to the annexed drawings.

Figure 2:
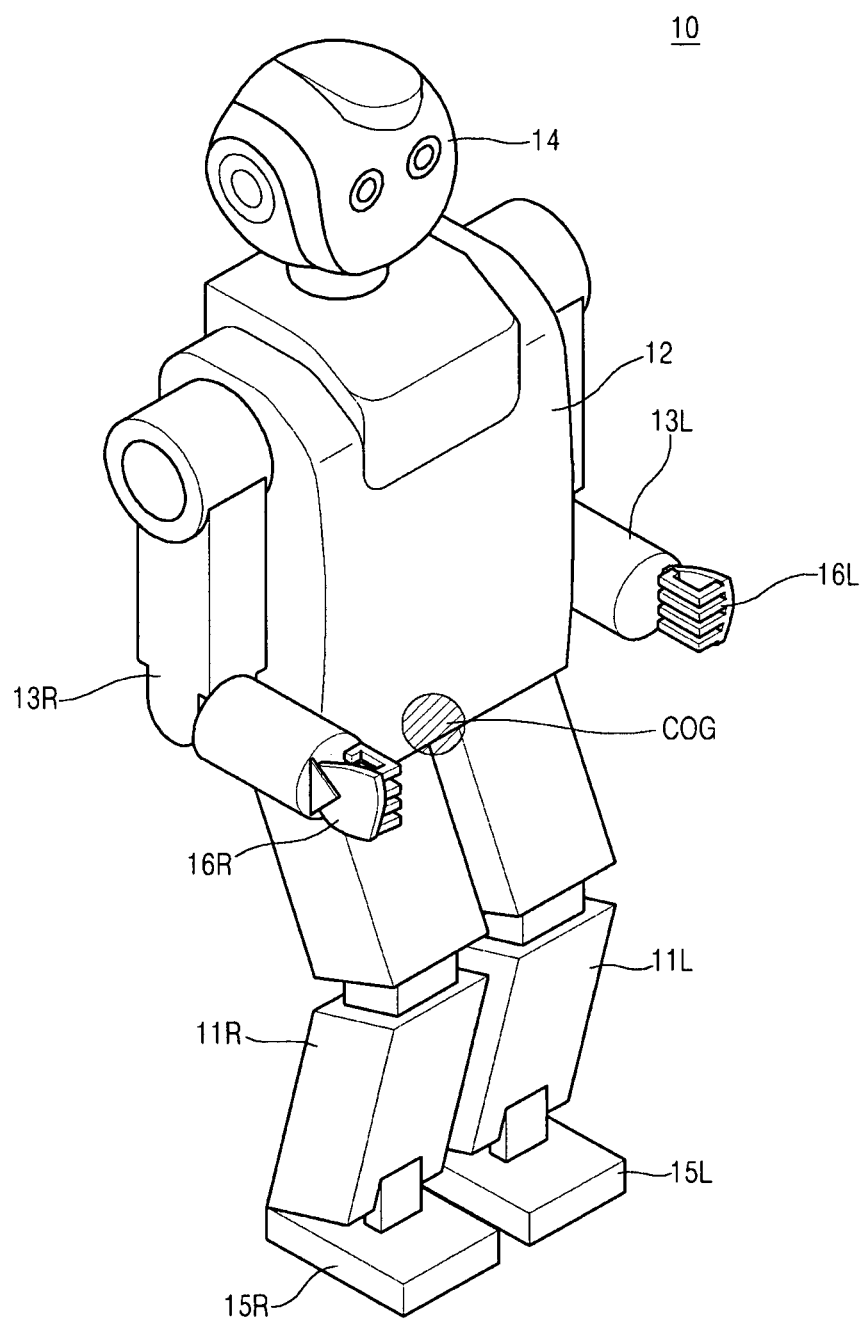
FIG. 2 is a schematic view illustrating the external appearance of a robot in accordance with an embodiment.

FIG. 2 is a schematic view illustrating the external appearance of a robot in accordance with an embodiment.

In FIG. 2, a robot 10 in accordance with this embodiment is a biped walking robot, which walks upright with two legs 11R and 11L in the same way as a human being, and includes a torso 12, two arms 13R and 13L and a head 14 provided at the upper portion of the torso 12, and feet 15R and 15L and hands 16R and 16L respectively provided at tips of the two legs 11R and 11L and the two arms 13R and 13L.

Here, R represents the right side of the robot 10, L represents the left side of the robot 10, and COG represents the center of gravity of the robot 10.

Figure 3:
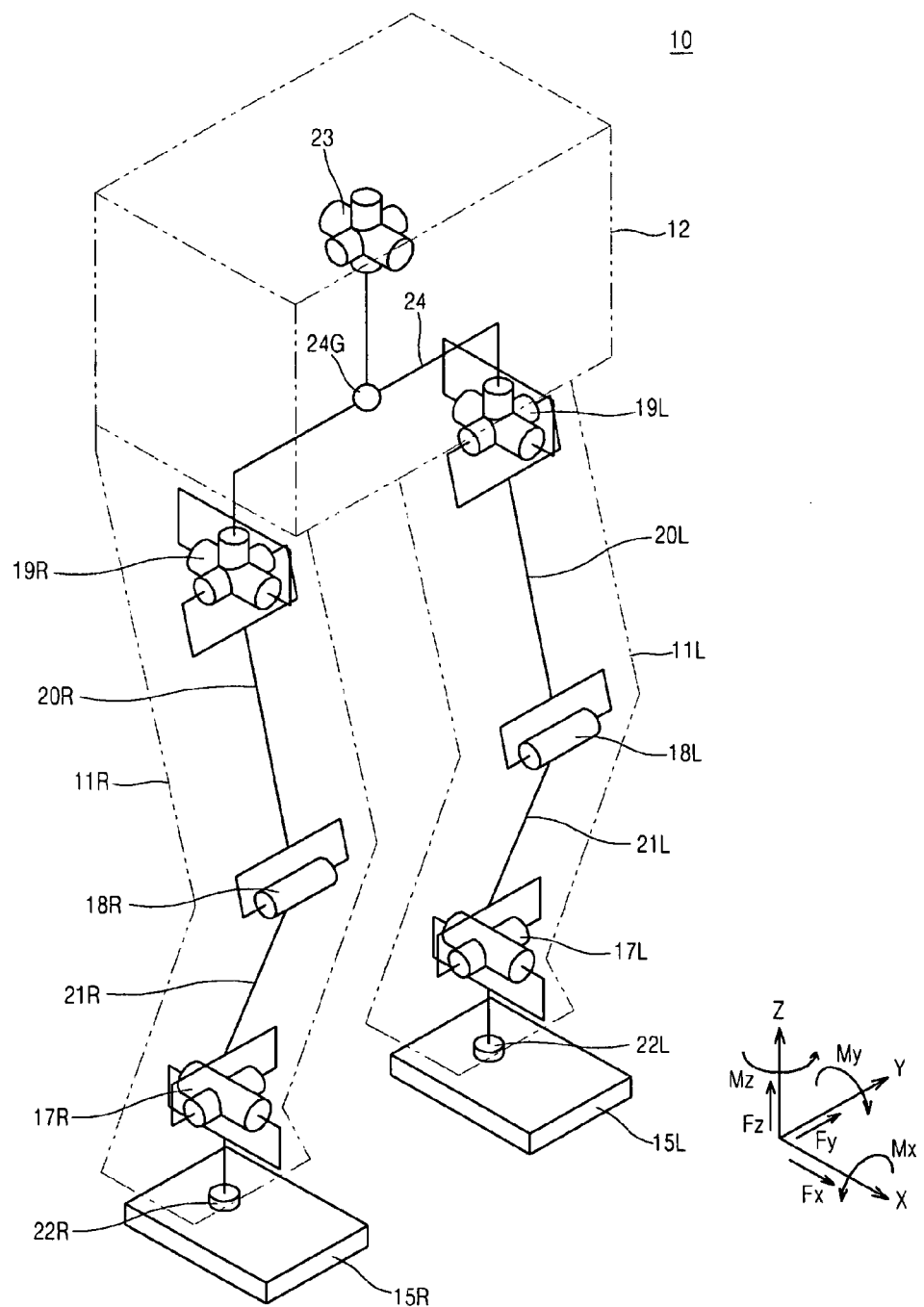
FIG. 3 is a view illustrating structures of main joints of the robot of FIG. 2.

FIG. 3 is a view illustrating structures of main joints of the robot of FIG. 2.

In FIG. 3, the two legs 11R and 11L respectively include ankle joints 17R and 17L, knee joints 18R and 18L, and hip joints 19R and 19L such that parts of the robot 10 corresponding to ankles, knees, and hips are rotatable, and the hip joints 19R and 19L are located at both sides of the lower portion of the torso 12 connected with the two legs 11R and 11L.

The ankle joints 17R and 17L of the respective legs 11R and 11L are movable in the directions of the X-axis (roll axis) and the Y-axis (pitch axis), the knee joints 18R and 18L of the respective legs 11R and 11L are movable in the direction of the Y-axis (pitch axis), and the hip joints 19R and 19L of the respective legs 11R and 11L are movable in the directions of the X-axis (roll axis), the Y-axis (pitch axis), and the Z-axis (yaw axis).

Further, the two legs 11R and 11L respectively include thigh links 20R and 20L connecting the hip joints 19R and 19L and the knee joints 18R and 18L, and calf links 12R and 12L connecting the knee joints 18R and 18L and the ankle joints 17R and 17L, and thus have a designated degree of freedom according to the movements of the respective joints 17R, 17L, 18R, 18L, 19R, and 19L. Force and torque (F/T) sensors 22R and 22L are respectively installed between the feet 15R and 15L and the ankle joints 17R and 17L of the legs 11L and 11R. The F/T sensors 22R and 22L measure three-directional components (Mx, My, Mz) of moment and three-directional components (Fx, Fy, Fz) of force transmitted from the feet 15R and 15L, and provide ZMP data. The ZMP refers to a point on the contact surface between the foot 15R or 15L (particularly, the sole of the foot 15R or 15L) and the ground, where the sum total of the moment in the direction of the X-axis (roll axis) and the moment in the direction of the Y-axis (pitch axis) is zero.

The torso 12 connected with the two legs 11R and 11L includes a waist joint 23 such that a part of the robot 10 corresponding to a waist is rotatable, and the waist joint 23 is located coaxially with the center of a hip link 24 connecting the hip joints 19R and 19L located at both sides of the lower portion of the torso 12, i.e., the center of gravity COG of the robot 10, and thus is movable in the directions of the X-axis (roll axis), the Y-axis (pitch axis), and the Z-axis (yaw axis).

Each of the joints 17R, 17L, 18R, 18L, 19R, 19L, and 23 of the robot 10 includes an actuator (not shown, for example, a driving device, such as a motor) to drive the corresponding joint.

Figure 4:
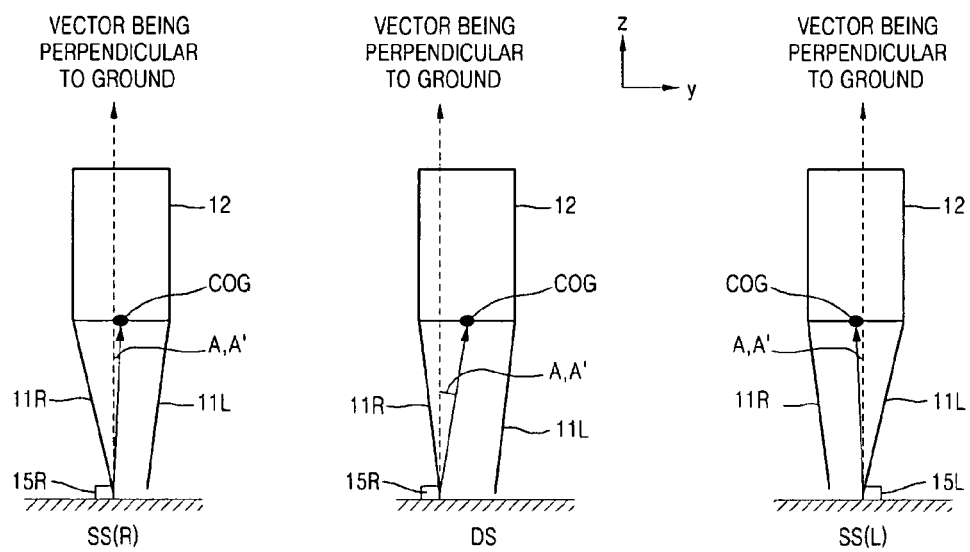
FIG. 4 is a view illustrating control angles set according to states of an FSM-based robot in accordance with the embodiment.

FIG. 4 is a view illustrating control angles set according to states of an FSM-based robot in accordance with the embodiment of the present invention, i.e., respectively illustrating the torso 12 and the right and left legs 11R and 11L of the robot 10 on a Y-Z plane (two-dimensional space) formed by the Y-axis (pitch axis) and the Z-axis (yaw axis).

In FIG. 4, there are three states of the FSM-based robot 10, i.e., a double support (hereinafter, is referred to as 'DS') state, in which the robot 10 is supported with its both feet, a single support right (hereinafter, is referred to as 'SS(R)') state, in which the robot 10 is supported with its right foot, and a single support left (hereinafter, is referred to as 'SS(L)') state, in which the robot 10 is supported with its left foot, and a finite state machine (FSM) is characterized in that these states are regularly repeated.

When a limit cycle is applied to the FSM-based robot 10, which balances itself, the curve of the limit cycle should be located in a stable region at any time. The robot 10 can stably balance itself right and left in case that the curve of the limit cycle forms the closed loop at any time without converging into one point or diverging. Therefore, in case that the robot 10 repeats the swing of one foot 15R or 15L and the swing of the other foot 15L or 15R, the limit cycle should form the closed loop at any time in order to form the stable region.

When the limit cycle is applied to the FSM-based robot 10 to balance the FSM-based robot 10 right and left on a two-dimensional space, the FSM-based robot 10 is balanced not by making contact of both feet 15R and 15L with the ground but by alternately swinging the two feet 15R and 15L.

A represents a control angle, at which the robot 10 can balance itself on a two-dimensional space using the limit cycle, and is defined as an angle between a vector, which is perpendicular to the ground, and a vector, which comes up to the center of gravity of the robot 10, from a contact point of the robot 10 with the ground (i.e., the sole of the foot of the supporting leg). The control angle A arises from the contact point of the robot 10 with the ground, and thus controls the ankle joint 17R or 17L of the robot 10. Further, A' represents a control angular velocity, which is a differential component of the control angle A.

As shown in FIG. 4, the control angle A and the control angular velocity A' in the DS state are maximum, and the control angle A and the control angular velocity A' in the SS(R) or SS(L) state are minimum. Therefore, when the relations between the control angles A and the control angular velocities A' in the DS state and the SS(R) or SS(L) state are applied to the limit cycle, the robot 10 can balance itself with alternately swinging its legs 15R and 15L.

Figure 5A:
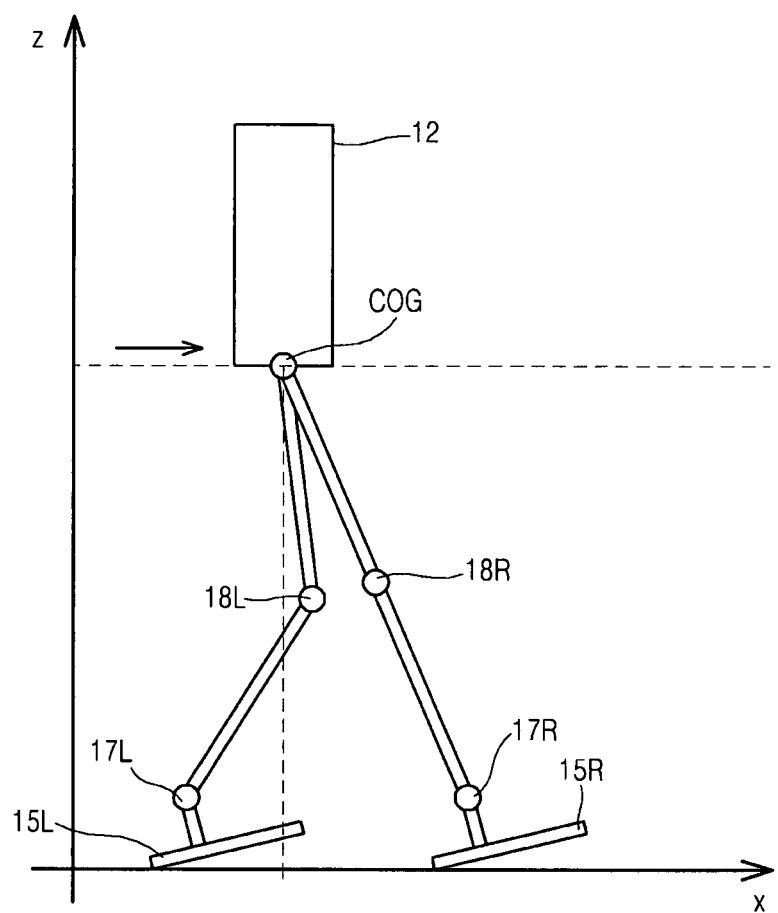
FIG. 5A is a view illustrating the FSM-based robot in accordance with the embodiment in a state in which feet of the robot contact the ground.

An interval between the two legs 11R and 11L, i.e., a hip interval, is a constant, which is set when hardware is manufactured due to actuators and several frames of the hardware. Therefore, when the constant has a large value, the radius of the limit cycle is increased, and, when the radius of the limit cycle is increased, a differential value obtained by controlling the control angle A using a sinusoidal function is increased by a multiple of the maximum value of the limit cycle, and thus a velocity is relatively increased at a regular walking time. That is, since the right and left repeatedly moving time of the robot 10 is restricted but the moving distance of the robot 10 is increased, the moving velocity of the robot 10 is increased. Thereby, since the sum total of the moments of the robot 10 is increased and the contact area of the foot 15R or 15L with the ground, i.e., the area of the sole of the foot 15R or 15L, is restricted, a moment arm is relatively shortened, and thus the sole of the foot 15R or 15L is not parallel with the ground and is tilted, as shown in FIG. 5A. It relates to the inertia and acceleration of the torso 12 of the robot 10 and the area of the soles of the right and left foot 15R and 15L. Therefore, the control angular velocity A', i.e., the differential value of the control angle A, should reduced by restricting the range of the control angle A of the limit cycle to balance the robot 10 right and left.

Figure 5B:
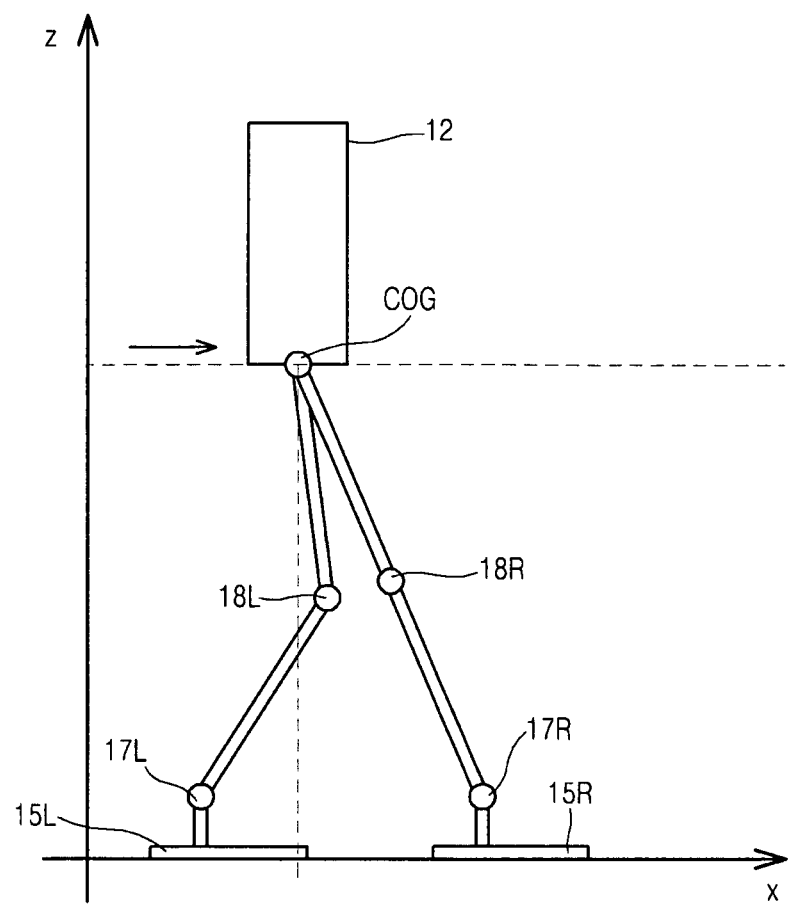
FIG. 5B is a view illustrating the FSM-based robot in accordance with the embodiment in a state in which the feet of the robot parallel contact the ground.
Figure 6:
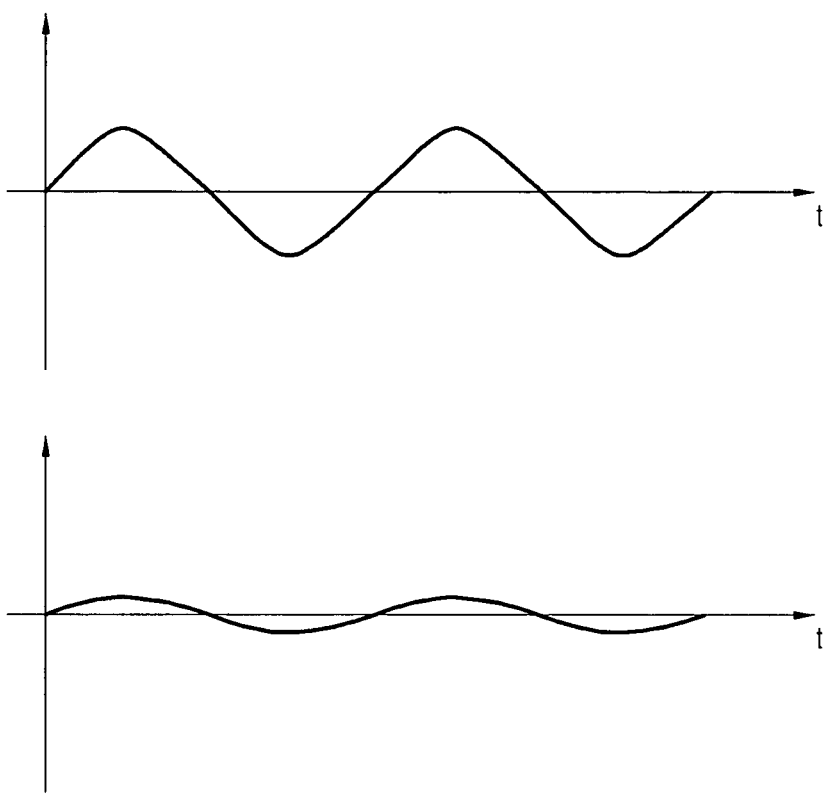
FIG. 6 shows graphs respectively illustrating sizes of a sinusoidal function to control limit cycle control angles in accordance with the embodiment.

On this account, in this embodiment, in the case where both legs 11R and 11L are drawn inward to reduce the limit cycle control angle A in the DS state, an interval between two feet 15R and 15L on the ground is reduced. When the same limit cycle control angle A is set based on the reduced interval, the limit cycle control angle is reduced, the maximum right and left moving distance of the center of gravity COG of the robot 10 is reduced, and the maximum velocity of the robot 10 is reduced. Therefore, the sum total of the moments of the robot is reduced and the non-parallel contact between the feet 15R and 15L of the robot 10 and the ground due to the inertia and the acceleration is reduced, and thus the soles of the feet 15R and 15L of the robot 10 become parallel with the ground, as shown in FIG. 5B. This effect is the same as that in a human being, in which the human being walks with maximally reducing an interval between both feet although there is an interval between hips. This phenomenon is understood from the above-described moment, inertia, and acceleration, and in order to solve the above problem, the human being also walks with reducing the interval between both feet such that the reduced interval between both feet is smaller than the interval between the hips. Accordingly, when the limit cycle control angle A is reduced, the size of the sinusoidal function to control the limit cycle control angle A is reduced, as shown in FIG. 6, and the walking figure of the robot 10 in this case is shown in FIG. 4.

Figure 7:
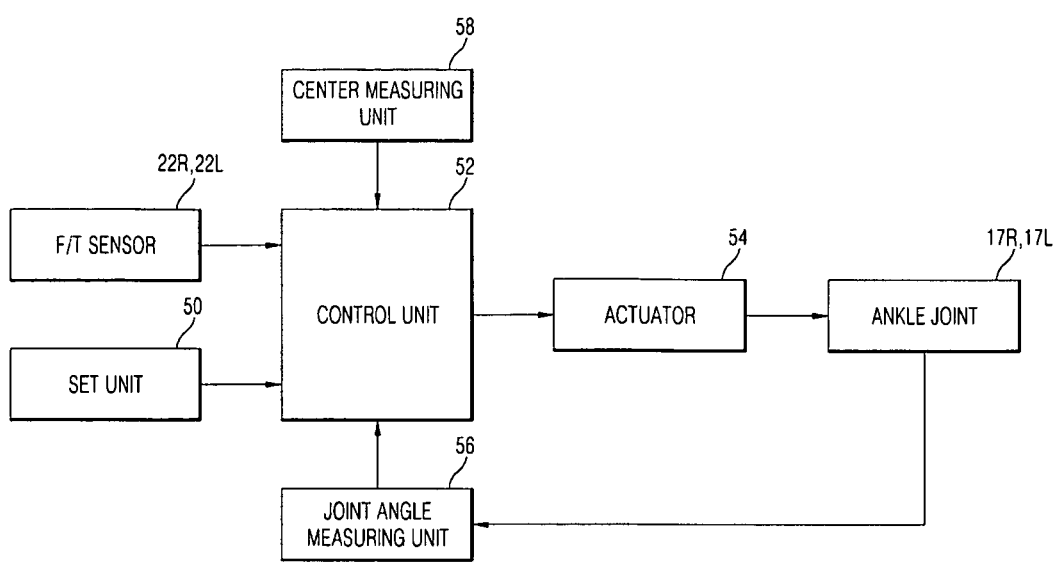
FIG. 7 is a control block diagram to balance the FSM-based robot in accordance with the embodiment.

FIG. 7 is a control block diagram to balance the FSM-based robot in accordance with the embodiment of the present invention. The FSM-based robot includes the F/T sensors 22R and 22L, a set unit 50, a control unit 52, actuators 54, a joint angle measuring unit 56, and a center measuring unit 58.

The F/T sensors 22R and 22L are respectively installed between the feet 15R and 15L and the ankle joints 17R and 17L of the two legs 11L and 11R. The F/T sensors 22R and 22L measure three-directional components (Mx, My, Mz) of moment and three-directional components (Fx, Fy, Fz) of force transmitted from the feet 15R and 15L, and provide ZMP data to the control unit 52. The ZMP refers to a point on the contact surface between the foot 15R or 15L (particularly, the sole of the foot 15R or 15L and the ground, where the sum total of the moment in the direction of the X-axis (roll axis) and the moment in the direction of the Y-axis (pitch axis) is zero.

The set unit 50 sets the limit cycle control angle A, which is defined as an angle between the vector, which is perpendicular to the ground, and the vector, which comes up to the center of gravity of the robot 10, from the contact point of the robot 10 with the ground (i.e., the sole of the foot of the supporting leg), such that the FSM-based robot 10 can balance itself right and left on the two-dimensional space. As shown in FIG. 4, the set unit 50 sets the limit cycle control angle A, which corresponds to the state of the robot 10. Here, the range of the set limit cycle control angle A is designated using the ZMP provided from the F/T sensors 22R and 22L such that the radius of the limit cycle is reduced. The range of a value of the radius of the limit cycle, at which the ZMP is deviated from the region of the foot 15R or 15L or is not concentrated onto the edge of the sole of the foot 15R or 15L for 1 circulation of the limit cycle, is calculated, and the range of the limit cycle control angle A is designated based on this range.

Figure 8:
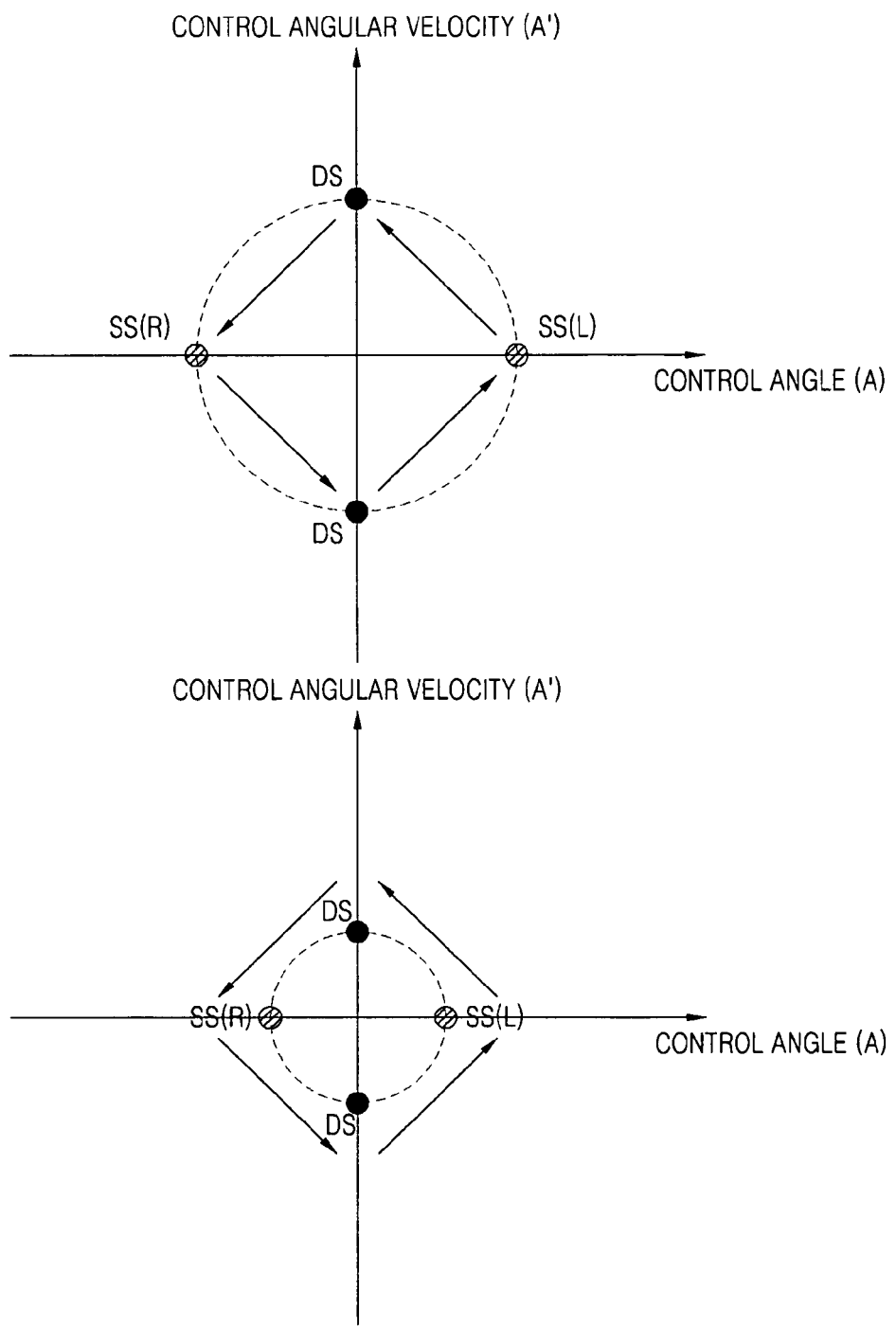
FIG. 8 shows graphs respectively illustrating closed loops formed by controlling the control angles, the range of which is set according to states of the FSM-based robot in accordance with the embodiment, using the sinusoidal function.

The control unit 52 controls the limit cycle control angle A, the maximum range of which is set corresponding to the state of the robot 10, using a sinusoidal function, such that the relation between the control angle A and the control angular velocity A' forms a circular/elliptical limit cycle, which is stable on a plane, as shown in FIG. 8, and thus the FSM-based robot 10 can balance itself right and left. As one method of various methods of forming the limit cycle in a closed loop, the relation between the control angle A and its differential component, i.e., the control angular velocity A', forms a stable circular/elliptical limit cycle using the sinusoidal function. When this limit cycle is used as an algorithm to balance the robot 10 right and left, the robot 10 can balance itself stably.

The method of controlling the control angle A using the sinusoidal function is represented by the below expressions 1 and 2.

Control angle $A = A\max \times \sin(\omega \times t)$  Expression 1

Control angular velocity $A' = A\max \times \omega \times \cos(\omega \times t)$  Expression 2

Here, Amax is a designed value, $\omega$ is a conversion cycle (control cycle) of the control angle A, and t is a variable of time.

Each of the actuators 54 drives the ankle joints 17R or 17L, a target angle of which forms the limit cycle (with reference to FIG. 8), when the control unit 52 controls the control angle A set corresponding to the state of the robot 10 using the sinusoidal function, according to a torque control signal of the control unit 52 such that the angle of the ankle joint 17R or 17L does not deviate from the limit cycle.

The joint angle measuring unit 56 measures the angle of the ankle joint 17R or 17L moving according to the driving of the actuator 54, and transmits the measured angle to the control unit 52. The joint angle measuring unit 56 is a control factor, which feeds the angle of the ankle joint 17R or 17L back to the control unit 52 to follow the control angle A set by the set unit 50.

The center measuring unit 58 measures the position of the center of gravity COG of the robot 10, which is varied according to the states of the robot 10, and transmits the measured position of the center of gravity COG of the robot 10 to the control unit 52. The center measuring unit 58 is a control factor, which feeds the position of the center of gravity COG of the robot 10 back to the control unit 52 to follow the control angle A set by the set unit 50.

FIG. 8 shows graphs respectively illustrating closed loops formed by controlling the control angles, the range of which is set according to states of the FSM-based robot in accordance with the embodiment, using the sinusoidal function.

In FIG. 8, it is shown that the reduced radius of the limit cycle is obtained from the relations of the control angles A, the range of which is restricted, and their control angular velocities A', and a linear velocity is relatively reduced for 1 circulation of the limit cycle and thus the sum total of the moments of the robot 10 is reduced and the soles of the feet of the robot 10 parallel contact the ground.

As described above, when the control angle A of the FSM-based robot 10 is controlled such that the range of the control angle A does not deviate from the closed loop to balance the robot 10 right and left on a two-dimensional space, the robot 10 can walk while balancing itself. Such a closed loop is nonlinear, and has a smooth circular shape and becomes stable, when the control angle A is controlled using the sinusoidal function.

Therefore, when the control angles A of FIG. 4, the range of which is set in consideration of the states of the FSM-based robot 10, are controlled using the sinusoidal function, points of the control angles A move and the relations between the control angles A and the control angular velocities A' form a limit cycle forming the stable closed loop while the robot 10 continuously repeats the DS state, the SS(R) state, the DS state, the SS(L) state, the DS state, . . . , and the robot 10 can walk while balancing itself unless the control angles A do not deviate from the limit cycle.

More specifically, in the FSM-based robot 10 having three states including the DS state, the SS(R) state, and the SS(L) state, the robot 10 is initially in the DS state, the right leg 11R continuously contacts the ground when the left leg 11L swings, and then the robot is again returned to the DS state after one step has been completed. Further, in order to form another step, the left leg 11L contacts the ground and the right leg 11R swings. The walking of the robot 10 is carried out by sequentially repeating the DS state and the SS(R) or SS(L) state. Here, the center of gravity COG of the robot 10 repeatedly moves to the leg(s) 11R and/or 11L contacting the ground. When the DS state and the SS(R) or SS(L) state are repeated, the control angles A should be properly set so as to balance the robot 10 right and left. A closed loop of the limit cycle is obtained by marking the control angles A, the range of which is restricted such that the radius of the limit cycle is reduced, and their differential components (the control angular velocities A') on a plane. However, in case the closed loop is not repeated or, if repeated, the closed loop is formed in a convergence/divergence type or a spiral type, the limit cycle becomes unstable. Therefore, in order to obtain the stable limit cycle, it is necessary to form the smooth circular/elliptical closed loop of the limit cycle, which is repeated, as shown in FIG. 8. Therefore, in order to balance the robot 10 right and left, the control angles A corresponding to the states of the robot 10 are properly set, such that the range of the control angles A is restricted, and are controlled using the sinusoidal function. Thereby, the relations between the control angles A and the control angular velocities A' form a stable elliptical cycle on a plane, and thus the robot 10 can balance itself.

As apparent from the above description, in the embodiment, when the limit cycle control angles A of the robot 10 are defined such that angles of the ankle joints 17R and 17L to be controlled to balance the FSM-based robot 10 right and left during walking form a closed loop, and the control angels A are controlled using the sinusoidal function, the robot can stably balance itself right and left.

In accordance with one embodiment of the present invention, in order to balance an FSM-based biped robot right and left on a two-dimensional space, limit cycle control angles to balance the robot according to states of the FSM-based biped robot are set. The range of the control angles is restricted to reduce the maximum right and left moving distance of the biped robot and thus to reduce the maximum right and left moving velocity of the biped robot, thereby reducing the sum total of the moments of the biped robot and thus allowing the ankles of the biped robot to balance the biped robot to be controlled, and causing the soles of the feet of the biped robot to parallel contact the ground and thus allowing the biped robot to stably walk similarly to a human being.

Although an embodiment of the invention has been shown and described, it would be appreciated by those skilled in the art that changes may be made in this embodiment without departing from the principles and spirit of the invention, the scope of which is defined in the claims and their equivalents.

What is claimed is:

1. A method of controlling balance of a finite state machine (FSM)-based biped walking robot having a right foot and a left foot comprising:
   reducing a range of control angles to balance the robot; and
   controlling the control angles using a sinusoidal function to balance the robot within a limit cycle,
   wherein the states of the FSM include a double support (DS) state, in which the robot is supported with both feet, and
   the reduction of the range of the control angles is achieved by reducing an interval between both feet on the ground by drawing both legs inward in the DS state.

2. The method according to claim 1, wherein the control angles are reduced in consideration of the center of gravity of the robot moving according to states of the FSM.

3. The method according to claim 1, wherein the states of the FSM include a single support right (SS(R)) state, in which the robot is supported with its right foot, and a single support left (SS(L)) state, in which the robot is supported with its left foot.

4. The method according to claim 1, wherein the reduction of the range of the control angles is achieved by reducing the maximum right and left moving distance of the robot.

5. The method according to claim 1, wherein the range of the control angels is designated using zero moment point (ZMP) data based on inertia and acceleration of the robot such that the radius of the limit cycle is reduced.

6. The method according to claim 1, wherein the control angles arise from the contact point of the robot with the ground, and control ankles of the robot.

7. The method according to claim 6, wherein the control angles are set to angles between a vector being perpendicular to the ground and a vector coming up to the center of gravity of the robot.

8. The method according to claim 3, wherein the control of the control angles using the sinusoidal function is achieved such that the limit cycle forms a stable closed loop according to the states of the FSM.

9. The method according to claim 8, wherein the control of the control angles using the sinusoidal function is achieved such that relations of the control angles and control angular velocities, which are differential components of the control angles, form the limit cycle in the stable closed loop on a two-dimensional space.

10. The method according to claim 9, wherein the control angle and the control angular velocity in the DS state are maximum.

11. The method according to claim 9, wherein the control angle and the control angular velocity in the SS(R) or SS(L) state are minimum.

12. A finite state machine (FSM)-based biped walking robot comprising:
  ankles;
  a set unit to set control angles of the ankles, the set unit setting the control angles corresponding to states of the FSM to balance the robot; and
  a control unit to reduce a range of the set control angles and control the control angles using a sinusoidal function to control the angles of the ankles within a limit cycle,
  wherein the control unit reduces the range of the control angles by reducing an interval between both feet on the ground by drawing both legs inward in the DS state.

13. The robot according to claim 12, wherein the control unit controls the control angles using the sinusoidal function such that the limit cycle forms a stable closed loop according to the states of the FSM.

14. The robot according to claim 12, further comprising force and torque (F/T) sensors to measure zero moment point (ZMP) data based on inertia and acceleration of the robot,
  wherein the control unit reduces the range of the control angles set according to the states of the FSM using the ZMP data.

15. The method according to claim 12, wherein the control unit reduces the range of the control angles by reducing the maximum right and left moving distance of the robot.

* * * * *

UNITED STATES PATENT AND TRADEMARK OFFICE
CERTIFICATE OF CORRECTION

PATENT NO. : 8,498,743 B2  Page 1 of 1
APPLICATION NO. : 12/588847
DATED : July 30, 2013
INVENTOR(S) : Ho Seong Kwak et al.

It is certified that error appears in the above-identified patent and that said Letters Patent is hereby corrected as shown below:

On the Title Page, In Column 2 (Other Publications), Line 2, Delete "Sciebce" and insert -- Science --, therefor.
In the Claims
In Column 10, Line 22, In Claim 15, Delete "method" and insert -- robot --, therefor.

Signed and Sealed this
Eighteenth Day of March, 2014

Michelle K. Lee
*Deputy Director of the United States Patent and Trademark Office*